United States Patent
Reddy et al.

(10) Patent No.: US 11,914,787 B2
(45) Date of Patent: *Feb. 27, 2024

(54) METHOD FOR DYNAMIC INTERACTION AND ELECTRONIC DEVICE THEREOF

(71) Applicant: Samsung Electronics Co., Ltd., Suwon-si (KR)

(72) Inventors: Kachana Raghunatha Reddy, Bangalore (IN); Vanraj Vala, Bangalore (IN); Barath Raj Kandur Raja, Bangalore (IN); Mohamed Akram Ulla Shariff, Bangalore (IN); Parameswaranath Vadackupurath Mani, Vandiperiyar (IN); Beda Prakash Meher, Sundargarh (IN); Mahender Rampelli, Hanmakonda (IN); Namitha Poojary, Bangalore (IN); Sujay Srinivasa Murthy, Bengaluru (IN); Amit Arvind Mankikar, Bangalore (IN); Balabhaskar Veerannagari, Bangalore (IN); Sreevatsa Dwaraka Bhamidipati, Bangalore (IN); Sanjay Ghosh, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/646,096

(22) Filed: Dec. 27, 2021

(65) Prior Publication Data

US 2022/0147153 A1  May 12, 2022

Related U.S. Application Data

(63) Continuation of application No. 16/134,873, filed on Sep. 18, 2018, now Pat. No. 11,209,907.

(30) Foreign Application Priority Data

Sep. 18, 2017 (IN) .............................. 201741033023
Sep. 6, 2018 (IN) .............................. 201741033023

(51) Int. Cl.
*G06F 3/01* (2006.01)
*G06F 3/16* (2006.01)
*G06V 40/20* (2022.01)

(52) U.S. Cl.
CPC .............. *G06F 3/017* (2013.01); *G06F 3/167* (2013.01); *G06V 40/20* (2022.01); *G06F 2203/011* (2013.01)

(58) Field of Classification Search
CPC .... G06F 3/017; G06F 3/167; G06F 2203/011; G06F 3/011; G06V 40/20
See application file for complete search history.

(56) References Cited

U.S. PATENT DOCUMENTS 8,751,042 B2   6/2014  Lee et al.
9,552,056 B1   1/2017  Barry et al.
(Continued)

FOREIGN PATENT DOCUMENTS

KR   10-2004-0061903 A   7/2004
KR   10-2011-0060319 A   6/2011
KR   10-2017-0013623 A   2/2017

OTHER PUBLICATIONS

Gleeson et al., Tap and push: Assessing the value of direct physical control in human-robot collaborative tasks., Journal of Human-Robot Interaction, vol. 4, No. 1, 2015, pp. 95-113. (Year: 2015).*

(Continued)

*Primary Examiner* — Abul K Azad

(57) ABSTRACT

Disclosed is a method for a social interaction by a robot device. The method includes receiving an input from a user, determining an emotional state of the user by mapping the (Continued)

received input with a set of emotions and dynamically interacting with the user based on the determined emotional state in response to the input. Dynamically interacting with the user includes generating contextual parameters based on the determined emotional state. The method includes determining an action in response to the received input based on the generated contextual parameters and performing the determined action. The method further includes receiving another input from the user in response to the performed action and dynamically updating the mapping of the received input with the set of emotions based on the other input for interacting with the user.

12 Claims, 20 Drawing Sheets

(56) References Cited

U.S. PATENT DOCUMENTS

| | | | |
|---|---|---|---|
| 10,427,306 B1* | 10/2019 | Quinlan | B25J 11/008 |
| 11,209,907 B2* | 12/2021 | Reddy | G06V 40/20 |
| 2005/0110867 A1 | 5/2005 | Schulz | |
| 2011/0178803 A1 | 7/2011 | Petrushin | |
| 2012/0185090 A1 | 7/2012 | Sanchez et al. | |
| 2012/0264095 A1 | 10/2012 | Yu et al. | |
| 2014/0112556 A1 | 4/2014 | Kalinli-Akbacak | |
| 2014/0225825 A1 | 8/2014 | Yamamoto et al. | |
| 2014/0282273 A1 | 9/2014 | Anderson | |
| 2014/0289778 A1 | 9/2014 | Matsubayashi | |
| 2015/0015509 A1 | 1/2015 | Shanabrook et al. | |
| 2016/0364002 A1* | 12/2016 | Gates | G06F 3/017 |
| 2017/0031559 A1 | 2/2017 | Lee et al. | |
| 2017/0161016 A1 | 6/2017 | McDunn et al. | |
| 2017/0244942 A1* | 8/2017 | Ma | H04N 9/3141 |
| 2018/0133900 A1 | 5/2018 | Breazeal et al. | |

OTHER PUBLICATIONS

Muxfeldt et al., Exploring tactile surface sensors as a gesture input device for intuitive robot programing., 2016 IEEE 21st International Conference on Emerging Technologies and Factory Automation, Sep. 6-9, 2016. (Year: 216).*

Lim et al., The MEI robot: Towards using motherese to develop multimodal emotional intelligence,. IEEE Transactions on autonomous mental development, vol. 6, No. 2, Jun. 2014. pp. 126-138. (Year: 2014).*

European Patent Office, "Communication pursuant to Article 94(3) EPC" dated Mar. 2, 2022, in connection with European Patent Application No. 18855834.0, 5 pages.

International Search Report dated Jan. 2, 2019 in connection with International Patent Application No. PCT/KR2018/010979, 3 pages.

Written Opinion of the International Searching Authority dated Jan. 2, 2019 in connection with International Patent Application No. PCT/KR2018/010979, 6 pages.

Office Action dated Jun. 24, 2020 in connection with India Patent Application No. 201741033023, 7 pages.

Supplementary European Search Report dated Oct. 20, 2020 in connection with European Patent Application No. 18 85 5834, 10 pages.

Summons to attend oral proceedings pursuant to Rule 115(1) EPC dated Apr. 4, 2023, in connection with European Patent Application No. 18855834.0, 13 pages.

Hearing Notice dated Dec. 6, 2023, in connection with Indian Patent Application No. IN201741033023, 4 pages.

Decision to Refuse dated Nov. 6, 2023, in connection with European Patent Application No. EP18855834.0, 15 pages.

Preliminary Opinion dated Oct. 10, 2023, in connection with European Patent Application No. EP18855834.0, 5 pages.

* cited by examiner

Emotion Database 312

| INPUT | REGION | EMOTION/ACTION |
|---|---|---|
| Tap | Top of Head | Positive |
| Double Tap | Bottom | Negative |
| Fast Tap | Left Side of Head | Happy |
| L-Pattern | Right Side of Head | Secure |
| Tap | Front | Happy |
| Hard Tap | Front | Frustration |

FIG.3B

Context :
User requested to send bank login details to some contact

Intent prediction : Secure

Result: Only authenticated person can access bank login details

METHOD FOR DYNAMIC INTERACTION AND ELECTRONIC DEVICE THEREOF

CROSS-REFERENCE TO RELATED APPLICATIONS

The present application is a continuation of U.S. patent application Ser. No. 16/134,873 filed on Sep. 18, 2018, which is based on and claims priority under 35 U.S.C. § 119 to India Patent Application No. 201741033023 filed on Sep. 18, 2017, and India Patent Application No. 201741033023 filed on Sep. 6, 2018, the disclosures of which are herein incorporated by reference in their entirety.

BACKGROUND

1. Field

Devices such as computers, phones, handheld devices, home appliances and the like rely on one or more actions by a user for interaction. The actions primarily pertain to explicit physical actions such as pressing a button or using a touch screen. Recently, smartphones have made use of voice inputs for interactions with a user. In contrast, interaction between a robot and the user can involve any or a combination of various modes of human-machine interaction such as verbal communication, gestural communication and the like.

2. Description of Related Art

In most instances of interaction between the user and the robot, the user usually interacts with voice input which are transformed as actionable intents and the robot emulates the behavior indicated by the voice input. Interactions between the user and the robot lack emotional engagement. Interactions are also non-dynamic by nature.

The above information is presented as background information only to help the reader to understand the present disclosure.

An object of the present disclosure herein is to provide a method and apparatus for a social interaction by a robot device.

Another object of the present disclosure herein is to provide a method to determine an emotional state of the user by recognizing a type of gestural input to the robot device.

Another object of the present disclosure herein is to provide a method to determine the emotional state of the user by recognizing the region on the robot device where the gestural input is received.

Another object of the present disclosure herein is to provide a method to recognize the context of the user interaction with the robot device and subsequently use the determined emotional state for providing an enhanced response to the user.

Another object of the present disclosure herein is to provide an emotion model showing a mapping between the region on the robot device, a gesture and an emotional state.

SUMMARY

Accordingly, embodiments herein provide a method for a social interaction by a robot device. The method includes receiving an input from a user, determining an emotional state of the user by mapping the received input with a set of emotions and dynamically interacting with the user based on the determined emotional state in response to the input.

In an embodiment, the input is one of a gestural input and a voice input.

In an embodiment, the method includes determining the emotional state of the user by determining a set of parameters based on the input. The set of parameters includes information indicative of at least one of the voice input, a pressure exerted by the user on at least one pre-defined region of the robot device, a heart rate of the user detected from the input, a speed of a gesture on the at least one pre-defined region and a gesture pattern on the at least one pre-defined region.

In an embodiment, dynamically interacting with the user includes generating contextual parameters based on the determined emotional state. The steps further include determining an action in response to the at least one input based on the generated contextual parameters and performing the determined action.

In an embodiment, the method further includes receiving another input from the user in response to the performed action and dynamically updating the mapping between the received input and the set of emotions based on the another input for interacting with the user.

Accordingly, embodiments herein provide a method of providing a social interaction by a robot device. The method includes receiving at least one of a voice input and at least one gestural input from a user. The method further includes determining an emotional state of a user by mapping at least one of the voice input and the at least one gestural input with a set of emotions and dynamically interacting with the user based on the determined emotional state.

Accordingly, embodiments herein provide a robot device for a social interaction with a plurality of users. The robot device includes a processor, a memory, coupled to the processor, and an interaction engine communicably coupled to the processor and the memory. The memory is configured to store a set of emotions. The interaction engine is configured to receive an input from a user, determine an emotional state of a user by mapping the received input with the set of emotions and dynamically interact with the user based on the determined emotional state in response to the input.

Accordingly, embodiments herein provide a robot device for a social interaction with a plurality of users. The robot device includes a processor, a memory, coupled to the processor, and an interaction engine communicably coupled to the processor and the memory. The memory is configured to store a set of emotions. The interaction engine is configured to receive at least one of a voice input and at least one gestural input from a user, determine an emotional state of a user by mapping at least one of the voice input and the at least one gestural input with the set of emotions and dynamically interact with the user based on the determined emotional state in response to at least one of the voice input and the at least one gestural input.

These and other aspects of the embodiments herein will be better appreciated and understood when considered in conjunction with the following description and the accompanying drawings. It should be understood, however, that the following descriptions, while indicating various embodiments and numerous specific details thereof, are given by way of illustration and not of limitation. Many changes and modifications may be made within the scope of the embodiments herein without departing from the spirit thereof, and the embodiments herein include all such modifications.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document. Those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 3B illustrates an example emotional model dynamically updated based on the social interaction between the robot device and the user, according to an embodiment of the present disclosure;

Figure 1A:
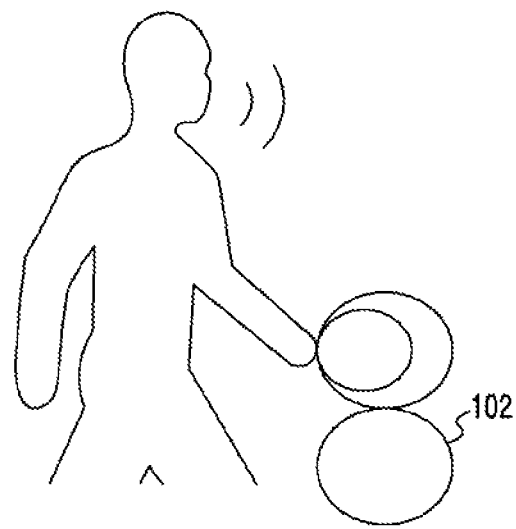
FIGS. 1A-1D illustrate pre-defined regions on a robot device, to receive voice and gestural input from a user, according to an embodiment of the present disclosure.

While embodiments of the present disclosure are described herein by way of example using several illustrative drawings, those skilled in the art will recognize the present disclosure is not limited to the embodiments or drawings described. It should be understood the drawings and the detailed description thereto are not intended to limit the present disclosure to the form disclosed, but to the contrary, the present disclosure is to cover all modification, equivalents and alternatives falling within the spirit and scope of embodiments of the present disclosure as defined by the appended claims.

DETAILED DESCRIPTION

FIGS. 1A through 16, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Various embodiments of the present disclosure will now be described in detail with reference to the accompanying drawings. In the following description, specific details such as detailed configuration and components are merely provided to assist the overall understanding of these embodiments of the present disclosure. Therefore, it should be apparent to those skilled in the art that various changes and modifications of the embodiments described herein can be made without departing from the scope and spirit of the present disclosure. In addition, descriptions of well-known functions and constructions are omitted for clarity and conciseness.

Also, the various embodiments described herein are not necessarily mutually exclusive, as some embodiments can be combined with one or more other embodiments to form new embodiments. Herein, the term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein. Further it should be possible to combine the flows specified in different figures to derive a new flow.

As is traditional in the field, embodiments may be described and illustrated in terms of blocks which carry out a described function or functions. These blocks, which may be referred to herein as managers, engines, controllers, units or modules or the like, may be implemented as software, or at least partially physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Conventional methods for a social interaction between a robot device and a user involve the robot device providing pre-configured responses to input from a user. In an example, the robot can receive a gestural command to play music and accordingly the robot plays music to the user. However, due to a lack of emotional engagement, a context to the gestural command or an intention of the user, which can be to play party music, is undetected. A user may impart a fast tap, a voice input signifying a happy emotion or any other action signifying a happy emotion to the robot device. Devoid of emotional engagement in the interaction, the intent of the user or the context to the interaction, the robot can fail to provide the specific type of music the user desires and can play any random music. Existing state of the art relates to the robot responding to an input by an action. However, due to a lack of emotional engagement, a context to the gestural command or an intention of the user is undetected.

Unlike conventional methods, the proposed method is directed to dynamic interaction between the robot device and a user. The proposed method provides for inferring by the robot device, an input from the user, by recognizing the type of input and the region on the robot device where the input is received. The method provides for configuring the robot device to recognize the context of the interaction and/or an emotional state of the user, and subsequently application of the recognized emotional state for providing an enhanced response to the user.

Referring now to the drawings, and more particularly to FIGS. 1A through 16, where similar reference characters denote corresponding features consistently throughout the figures, there are shown various embodiments.

FIGS. 1A-1D illustrate a robot device 102, to receive voice and gestural input from a user. The robot device 102 (hereinafter interchangeably referred to as an 'electronic device', a 'robot', a 'robot apparatus' or a 'social robot') receives an input from the user. The robot device 102 can include one or more sensors at different regions that are capable of detecting the input from the user. The one or more sensors include any or a combination of a haptic sensor, a heat sensor, a microphone, a camera and the like aiding in receiving different kinds of gestural inputs along with voice inputs, facial expressions of the user and the like. The input is used to detect the emotional state of the user and to provide a response to the user. Examples of few possible gestures to express the user's emotion include rocking on a head region of the robot device 102, patting the head region, closing the sides of the head region, holding the head region, tapping the sides of the head region, pinching a bottom region of the robot device 102, making patterns on the various regions of the robot device 102 and the like.

Figure 1B:
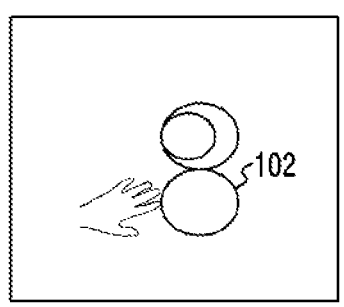
Figure 1C:
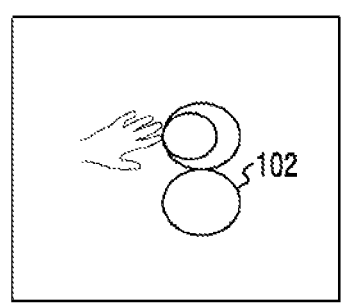
Figure 1D:
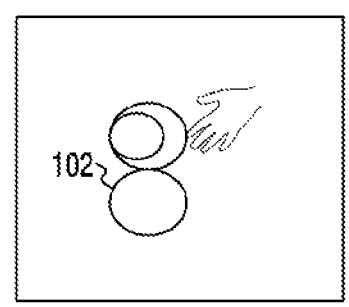

FIGS. 1B-1D illustrate the robot device 102 receiving gestural inputs on different regions. Each region can be connected or communicably coupled to sensors that detect a gestural input (hereinafter interchangeably referred to as 'gesture(s)') on the region. The sensors at each region can convert the gesture to at least one electrical signal and transmit the at least one electrical signal to various hardware components in the robot device 102 to determine a set of parameters indicative of any or a combination of a pressure exerted by the user on any or a combination of the regions of the robot device 102, a heart rate of the user detected from the gesture, a speed of the gesture on any or a combination of the regions of the robot device 102 and a pattern of the gesture on any or a combination of the regions of the robot device 102. Accordingly, the robot device 102 responds based on an emotion model that is trained to determine an intent from the type of gesture received on the region. For example, the type of the gestural input includes at least one of rocking on a part of the robot device 102, pocking on a part of the robot device 102, patting on a part of the robot device 102, closing a part of the robot device 102, holding a part of the robot device 102, slapping on a part of the robot device 102, pinching on a part of the robot device 102, circular gestures on a part of the robot device 102, or pushing a part of the robot device 102. Herein, the part of the robot device 102 can include a head, at least one ear, a face or at least one cheek of the robot device 102.

In some embodiments, the emotion model includes mappings between the gesture and an emotion. Contextual parameters relating to the emotional state of the user and the intent of the user are determined based on the input received. For example, a hard tap on a front region of the robot device 102 is indicative of frustration. When the hard tap is coupled with a voice query to order pizza, the robot device 102 orders a cheese pizza without any additional interaction. The emotion database is dynamically updated based on responses from the user after the action performed as per the mapping in the emotion database. Techniques of deep learning or machine learning such as but not limited to recurrent neural networks (RNN) and long short term memory (LSTM) can be used to dynamically update the emotion database.

In some embodiments, the emotion model is stored with preset mappings between regions, inputs and emotions from databases with multi-modal content. Gestures and corresponding emotions are extracted from multi-modal content that can be available over the Internet or provided by a manufacturer of the robot device 102. The emotion model is dynamically updated based on various interactions with the user.

In some embodiments, the robot device 102 can include communication units pertaining to communication with remote another device (e.g., computers, servers or remote databases) over a communication network. The communication network can include a data network such as, but not restricted to, the Internet, local area network (LAN), wide area network (WAN), metropolitan area network (MAN) etc. In certain embodiments, the communication network can include a wireless network, such as, but not restricted to, a cellular network and may employ various technologies including enhanced data rates for long term evolution (LTE), new radio (NR), global evolution (EDGE), general packet radio service (GPRS), global system for mobile communications (GSM), Internet protocol multimedia subsystem (IMS), universal mobile telecommunications system (UMTS) etc. Accordingly, the robot device 102 is included with communication components facilitating communications over the communication network. In some embodiments, the robot device 102 can be part of an Internet of Things (IoT) network. The robot device 102 can control various nodes such as a thermostat, faucets, electrical appliances, phones etc. on the IoT network. For example, based on an interaction with the user, the robot device 102 can direct the thermostat to lower temperature in a room.

Figure 2:
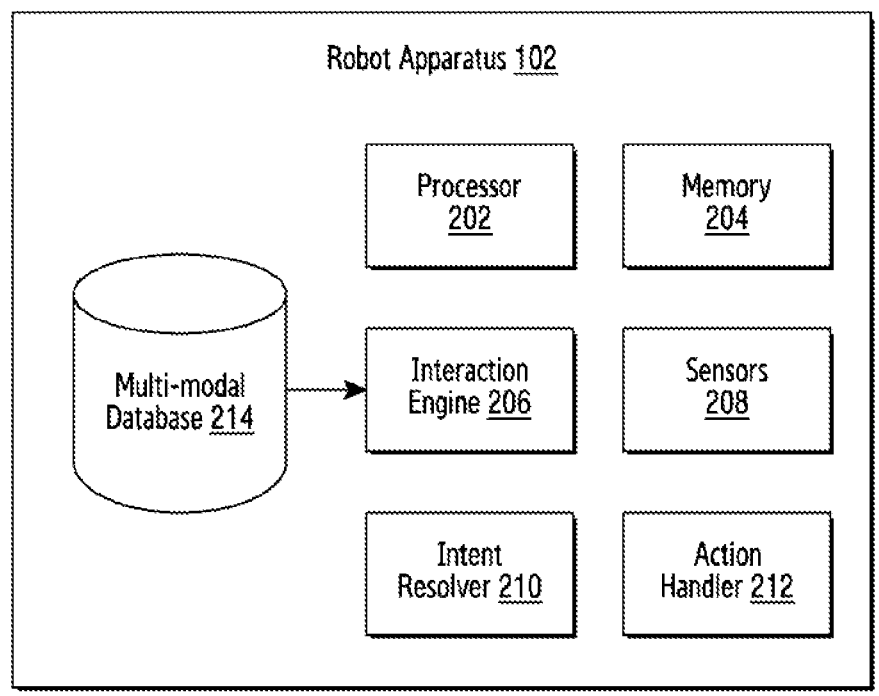
FIG. 2 is a block diagram illustrating hardware components of the robot device, according to an embodiment of the present disclosure.

FIG. 2 is a block diagram illustrating hardware components of the robot device 102. The robot device 102 includes a processor 202, a memory 204, an interaction engine 206, sensor 208, an intent resolver 210 and an action handler 212.

The processor 202 can be, but not restricted to, a central processing unit (CPU), a microprocessor, or a microcontroller. The processor 202 is coupled to the memory 204, the interaction engine 206, the sensor 208, the intent resolver 210 and the action handler 212. The processor 202 executes sets of instructions stored on the memory 204.

The memory 204 includes storage locations to be addressable through the processor 202. The memory 204 is not limited to a volatile memory and/or a non-volatile memory. Further, the memory 204 can include one or more computer-readable storage media. The memory 204 can include non-volatile storage elements. For example non-volatile storage elements can include magnetic hard discs, optical discs, floppy discs, flash memories, or forms of electrically programmable memories (EPROM) or electrically erasable and programmable (EEPROM) memories.

In some embodiments, the memory 204 is coupled to a multi-modal database 214. The multi-modal database 214 is a source for multi-modal content used for extracting information indicative of gestures and corresponding emotions. The extracted gestures and corresponding emotions are mapped to pre-defined regions on the robot device 102 and forms the emotion model.

The multi-modal database 214 can be but not limited to a relational database, a navigational database, a cloud database, an in-memory database, a distributed database and the like. In some embodiments, the multi-modal database 214 can be stored on the memory 204. In some other embodiments, the multi-modal database 214 is stored on a remote computer, a server, a network of computers or the Internet.

The sensor 208 transmits signals indicative of the input received to the interaction engine 206, the intent resolver 210 and the action handler 212. In some embodiments, the input is the gesture. In some other inputs, the input is a voice input. In some other embodiments, the input can be an image and/or a moving image captured by the camera from which a facial expression can be extracted by the interaction engine 206. In yet other embodiments, the input can be any or a combination of the gesture, the voice input and the image (and/or the moving image) that is used to augment determination of the emotional state of the user.

The interaction engine 206, the intent resolver 210 and the action handler 212 can be any processing unit or a chipset that receives the input from the user through the sensor 208. The interaction engine 206 determines the emotional state of the user by mapping the received input to the set of emotions in the emotion database stored in the memory 204. The interaction engine 206 dynamically interacts with the user based on the determined emotional state of the user. The interaction engine 206 directs the intent resolver 210 to infer an intent of the user from the determined emotional state and the type of input and then further directing the action handler 212 to determine and perform an action based on the inferred intent.

Figure 3A:
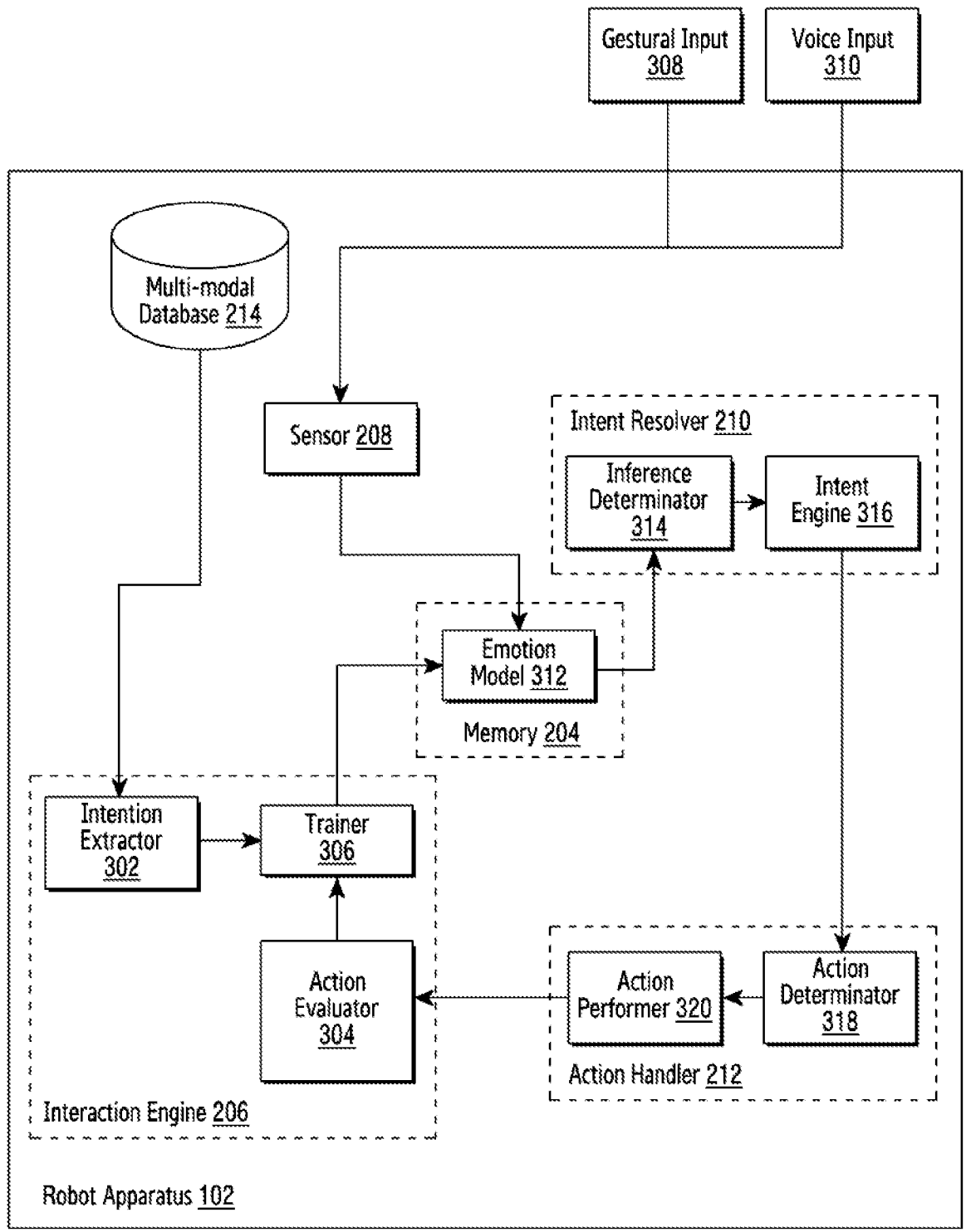
FIG. 3A is a flow diagram illustrating a method of social interaction between the robot device and the user, implemented with the hardware components of the robot device, according to an embodiment of the present disclosure.

FIG. 3A is a flow diagram illustrating the proposed method implements with the hardware components of the robot device 102, according to an embodiment of the present disclosure. Referring to FIG. 3A, the interaction engine 206 includes an intention extractor 302, an action evaluator 304, and a trainer 306. According to an embodiment, the intention extractor 302 extracts information indicative of regions synonymous with regions of the robot device 102 on which one or more inputs (e.g., a gesture) may be received, the type of the one or more inputs and the corresponding emotion from the multi-modal database 214. The action evaluator 304 evaluates the input. Based at least in part on an outcome of the evaluating of the input, the trainer 306 trains the robot device 102, for example, by updating the emotion model 312 with evaluation information. The sensor 208 receives an input, which may be any or a combination of the gestural input 308 (hereinafter interchangeably referred to as the gesture(s) 308) and the voice input 310. The sensor 208 transmits signals indicative of the input from which the interaction engine 206 extracts gestures and emotions. Accordingly, based on an existing mapping of the extracted gesture to the emotion in the emotion model 312, the intent resolver 210 is directed to infer a context of the input using an inference determinator 314 and predict the intent of the user using an intent engine 316. Based on the predicted intent, an action is determined by an action determinator 318 and performed by an action performer 320. The action determinator 318 and the action performer 320 are part of the action handler 212.

If the user responds to the performed action, the response is received by the sensor 208 as another input from the gesture and/or emotion is extracted and compared with the emotion model 312. The emotion model 312 is dynamically updated with a mapping of the received input with another emotion from the emotion model, based on the other input.

FIG. 3B illustrates the emotion model 312. As shown in FIG. 3B, the input is mapped to the region on which the input is provided and a corresponding emotion. For example, a tap on the head region of the robot device 102 corresponds to a positive emotion while a double tap on the bottom region of the robot device 102 is indicative of a negative emotion. These mappings are extracted from the multi-modal database 214.

In some embodiments, the emotion model 312 is stored on the memory 204. In some other embodiments, the emotion model 312 is stored on a remote computer, a server, a network of computers or the Internet, and is communicably coupled with the memory 204.

Based on interactions with the user, the emotional model 312 is updated with mappings between the input, the region of the robot device 102 where the input is provided and the emotion. In some embodiments, the action performed by the action handler 212 is directly mapped to the input and the region. In an example, the user provides a voice query to play music. The robot device 102 picks a song to play that the user may like. In response, the user may tap the robot device 102 on top of the head region. The action handler 212 predicts this gesture to correspond to a happy emotion based on content from the multi-modal database 214. The emotion model 312 is trained to map the tap to be a happy emotion. The training is enforced based on subsequent interactions with the user. In some embodiments, the user provides a voice input indicative changing the music following a tap on the head region, the emotion model 312 is updated accordingly.

In some embodiments, the robot device 102 is switched on or switched to an awake state through a pre-configured gesture provided by the user on any region of the robot device 102 connected to the sensor 208. This could also be trained over various social interactions between the user and the robot device 102 such that the robot device 102 identifies the user with whom the interaction occurs.

Figure 4:
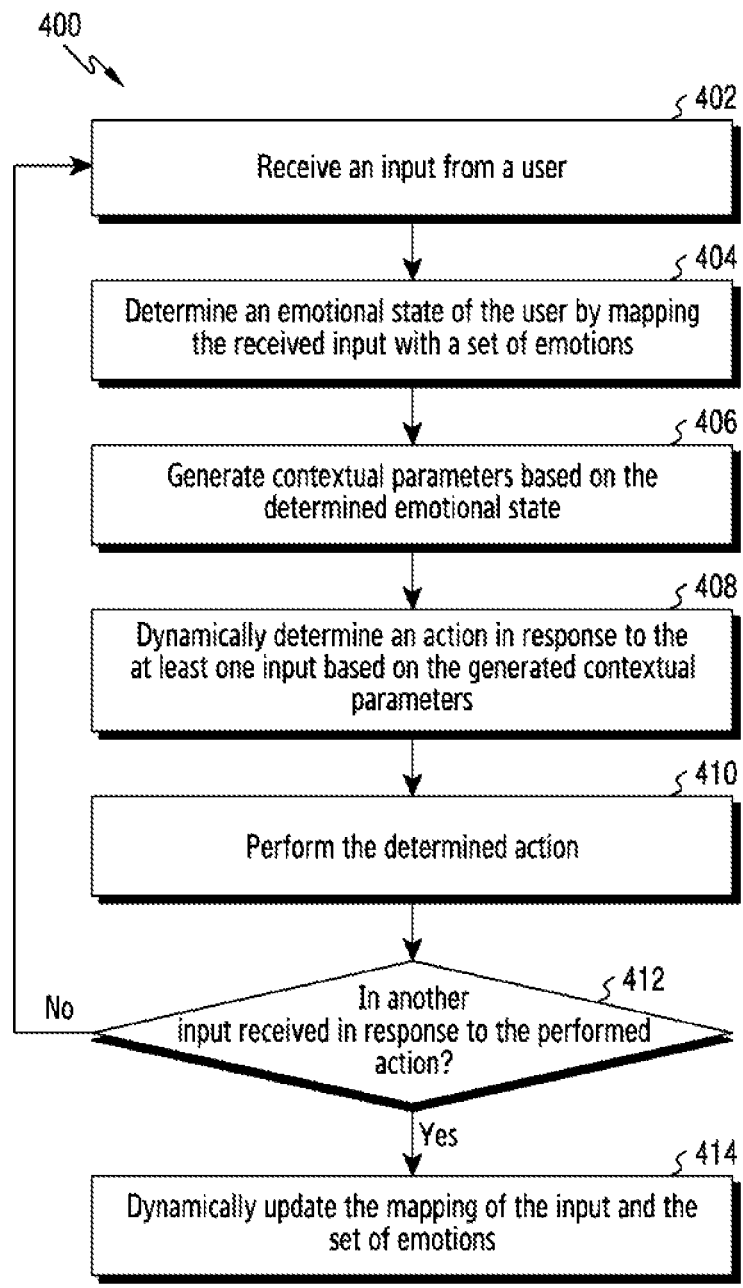
FIG. 4 is a flow diagram illustrating the method of social interaction with the gestural input or the voice input to the robot device, according to an embodiment of the present disclosure.

FIG. 4 is a flow diagram illustrating a method 400 for the social interaction by the robot device 102 with the user.

Referring to FIG. 4, at step 402, the robot device 102 receives a voice input. For example, at least one of the one or more sensors 208 may receive an input from the user.

At step 404, the robot device 102 determines an emotional state of the user by mapping the received input with a set of emotions. The interaction engine 206 may extract information indicative of a gesture and an emotion that is compared to mappings stored in the emotion model 312 in the memory 204. Based at least in part on an outcome of the comparison, the emotional state of the user is determined.

At step 406, the robot device 102 generates contextual parameters based on the determined emotional state. For example, the intent resolver 210 may be directed, for example, by the interaction engine 206, to determine contextual parameters pertaining to the received input and consequently to determine the intent of the user.

At step 408, the robot device 102 determines an action in response to the at least one input based on the generated contextual parameters. The action handler 212 may be directed, for example, by the interaction engine 206 to dynamically determine an action in response to the input received.

At step 410, the robot device 102 performs the determined action. The action handler 212 may perform the determined action. Herein, the determined action can include at least one of reproducing a media, storing information indicated by the input, entering a mode corresponding to the input, or transmitting information indicated by the input.

At step 412, the robot device 102 determines whether another input is received in response to the performed action. For example, the intent resolver 210 may check whether another input is received from the user via at least one of the one or more sensor 208 in response to the performed action.

If the other input is received, at step 414, the robot device 102 updates the mapping of the input and the set of emotions. Specifically, the emotion model 312 may be dynamically updated. If the other input is not received, the robot device 120 returns to step 402.

Figure 5:
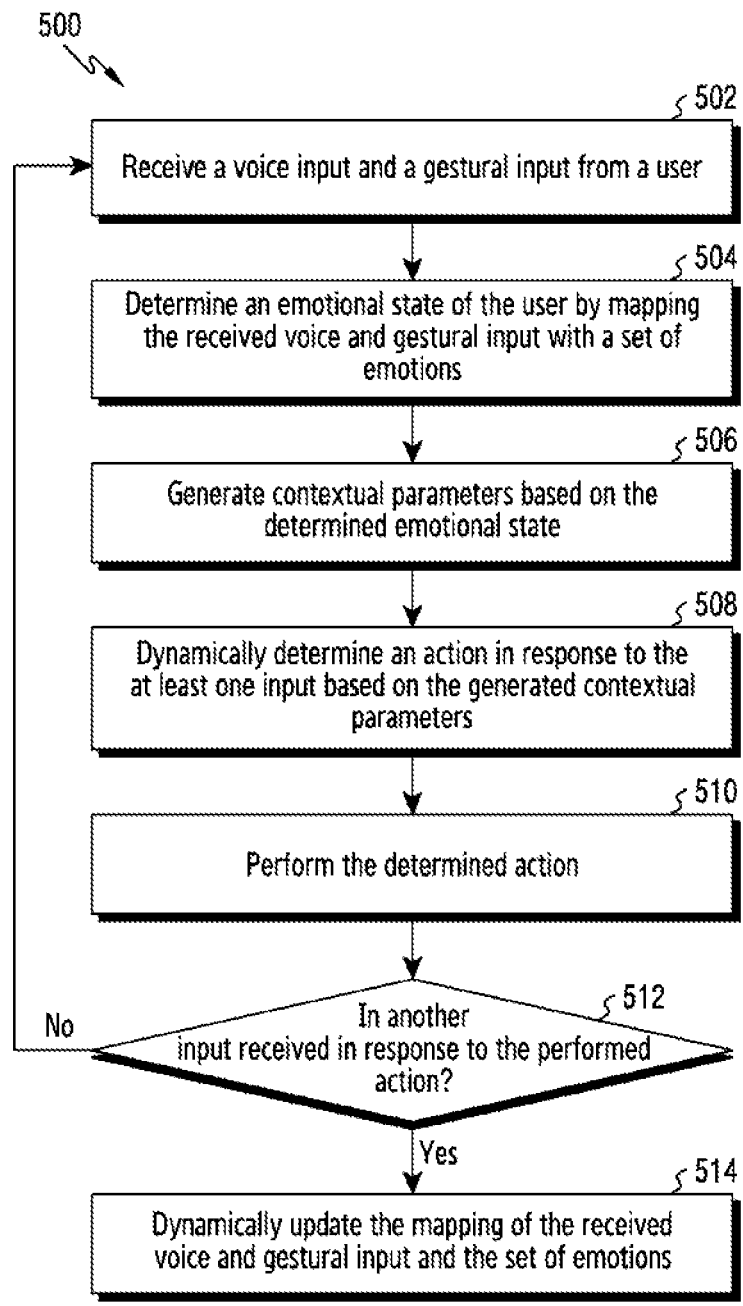
FIG. 5 is a flow diagram illustrating the method of social interaction with the voice input and the gestural input to the robot device, according to an embodiment of the present disclosure.

FIG. 5 is a flow diagram illustrating a method 500 for the social interaction by the robot device 102 with the user.

Referring to FIG. 5, at step 502, the robot device 102 receives a voice input and gestural input from a user. The sensor 208 receive a voice input and a gestural input from the user and accordingly, the interaction engine 206 extracts information indicative of a gesture and an emotion that is compared to mappings stored as the emotion model 312 in the memory 204.

At step 504, the robot device 102 determines an emotional state of the user by mapping the received voice and the gestural input with a set of emotions. The emotional state of the user is determined at step 504.

At step 506, the robot device 102 generates contextual parameters based on the determined emotional state. For example, the intent resolver 210 is directed by the interaction engine 206 to determine contextual parameters pertaining to the received gestural input and the voice input. Consequently the intent resolver 210 determines the intent of the user.

At step 508, the robot device 102 determines an action in response to the at least one input based on the generated contextual parameters. For example, the action handler 212 is directed by the interaction engine 206 to dynamically determine an action in response to the input received.

At step 510, the robot device 102 performs the determined action. The action handler 212 performs the determined action. Herein, the determined action can include at least one of reproducing a media, storing information indicated by the voice input or gestural input, entering a mode corresponding to the voice input or the gestural input, or transmitting information indicated by the voice input or the gestural input.

At step 512, the robot device 102 determines whether another input is received in response to the performed action. If the other input is received from the user by the sensor 208 in response to the performed action, the robot device 102 updates the mapping of the received voice and gesture input and the set of emotions. Specifically, the emotion model 312 is dynamically updated. If the other input is not received, the robot device 120 returns to step 502.

Examples of the social interaction between the user and the robot device 102 are explained in later parts of the description in conjunction with FIGS. 6A-15.

Figure 6A:
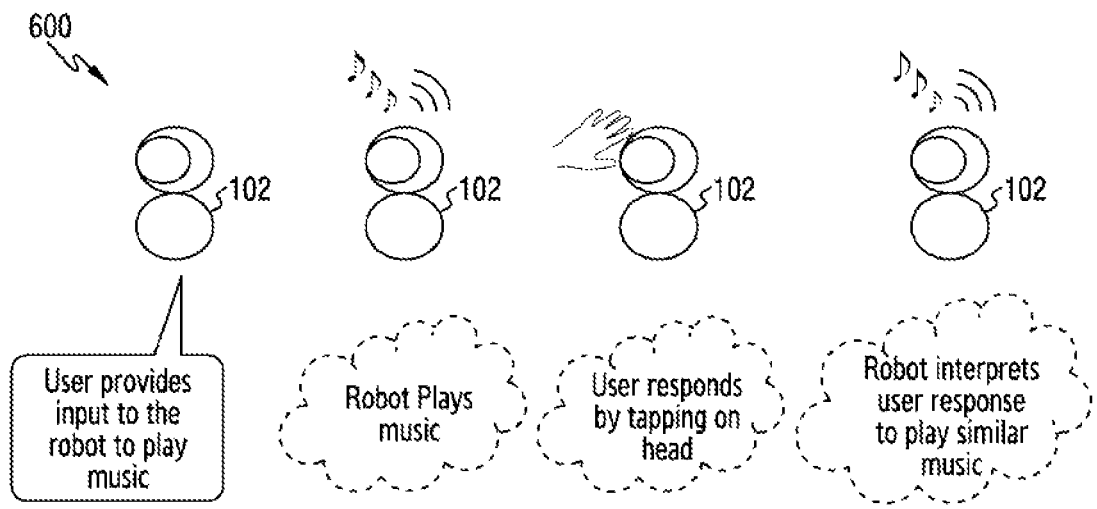
FIGS. 6A and 6B illustrate an example scenario where the robot device interprets the gestural input to continue playing a same kind of music, according to an embodiment of the present disclosure.

FIG. 6A illustrates an example scenario 600 where the robot device 102 interprets the gesture to continue playing a same kind of music. The user may provide an input indicative of the robot device 102 playing music. The action handler 212 (shown in FIG. 2) is directed to play a type of music based on a preset mapping in the emotional model 312 where the input provided by the user is mapped to playing a type of music. The user responds by tapping on the head region of the robot device 102. The gesture of tapping on the head region is mapped to a happy emotion and causes the intent resolver 210 to interpret the user response to play similar music upon receiving the voice input from the user.

Figure 6B:
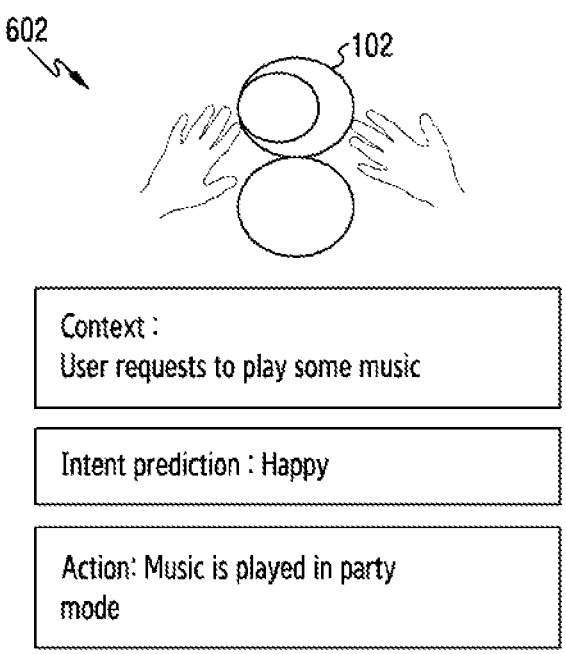

FIG. 6B illustrates an example scenario 602 where an input is mapped to playing music in a party mode, according to an embodiment. The user may hold the head region of the robot device 102 with both hands as shown and based on the mapping in the emotion model 312, the intent resolver 210 infers that the user is requesting music indicative of a happy emotion and accordingly, the action handler 212 is directed by the interaction engine 206 (shown in FIGS. 2 and 3A) to play music in a party mode.

Figure 7:
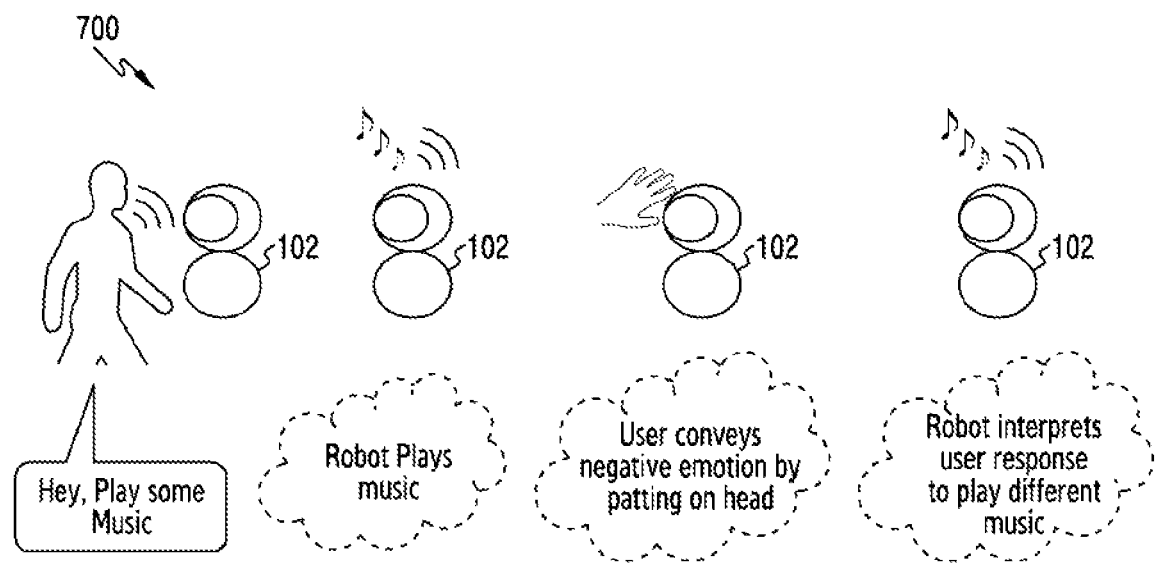
FIG. 7 illustrates an example scenario where the robot device interprets a user gesture to play a different kind of music, according to an embodiment of the present disclosure.

FIG. 7 illustrates an example scenario 700 where the robot device 102 interprets a gesture input to play a different kind of music. The user may provide a voice input to the robot device 102 to play music. The action handler 212 (shown in FIG. 2) is directed to play a type of music based on a preset mapping in the emotional model 312 where the input provided by the user is mapped to playing a type of music. The user responds by tapping on the head region of the robot device 102. The gesture of tapping on the head region is mapped to a negative emotion and causes the intent resolver 210 to interpret the user response to play different music upon receiving the voice input from the user.

Figure 8A:
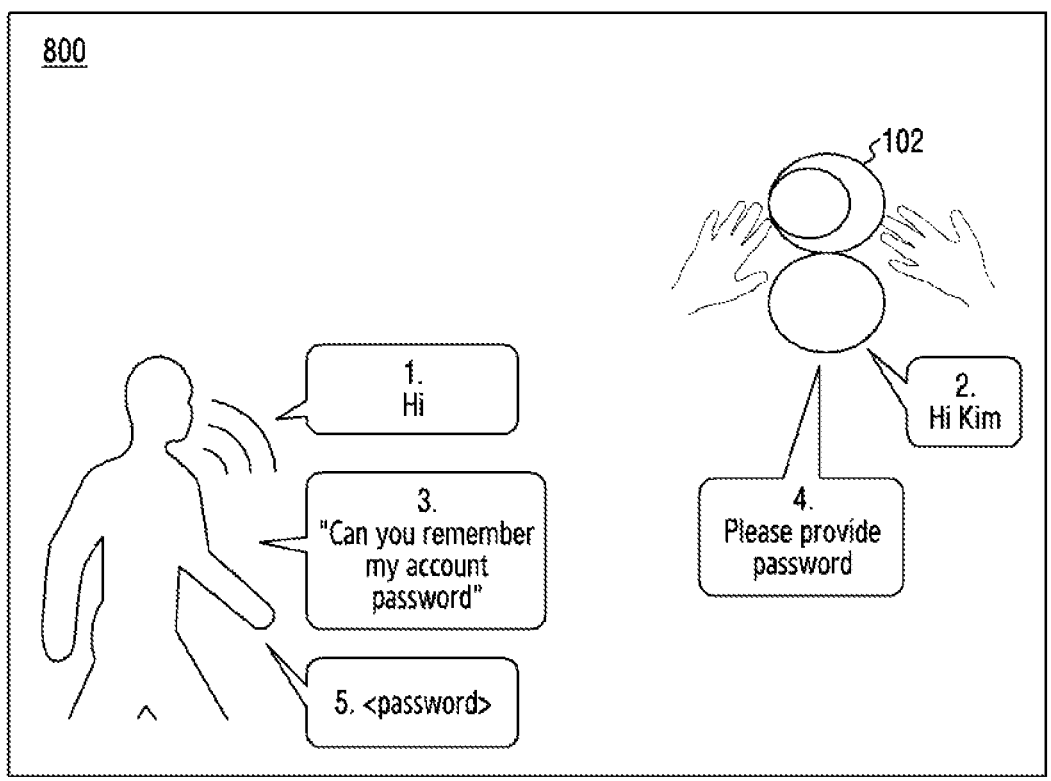
FIGS. 8A and 8B illustrate an example scenario where the robot device stores secure information of the user, according to an embodiment of the present disclosure.
Figure 8B:
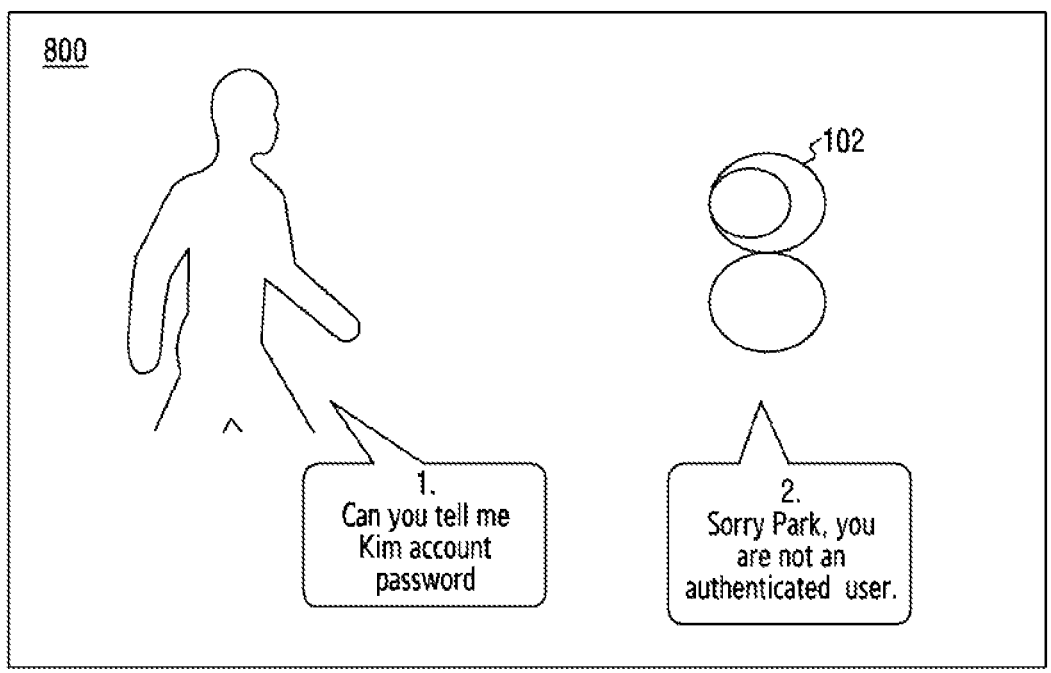

FIGS. 8A and 8B illustrate an example scenario where the robot device 102 stores secure information of the user. In FIG. 8A, a user "Kim" holds the robot device 102 with two hands on the head region thereby providing a context indicative of a secure mode or a secure interaction. Accordingly, voice input indicative of storing a password is received by the robot device 102. Based on the context of being secure information, as determined by the interaction engine 206 and the intent resolver 210 (shown in FIGS. 2 and 3A), the robot device 102 stores the password in the memory 204. In some embodiments, the password is stored in a secure portion of the memory 204. In other embodiments, the password can be stored on a secure memory communicably coupled to the processor 202, the memory 204, the interaction engine 206, the intent resolver 210, and the action handler 212. Further, with the gesture of holding the head region with two hands, the robot device 102 identifies the user "Kim" as an authenticated user. In FIG. 8B another user "Park" provides a voice input indicative of requesting the stored password. Since "Park" is not an authenticated user of the robot device 102, the interaction engine 206 directs the action handler 212 to cause to decline the request from the user "Park".

Figure 9A:
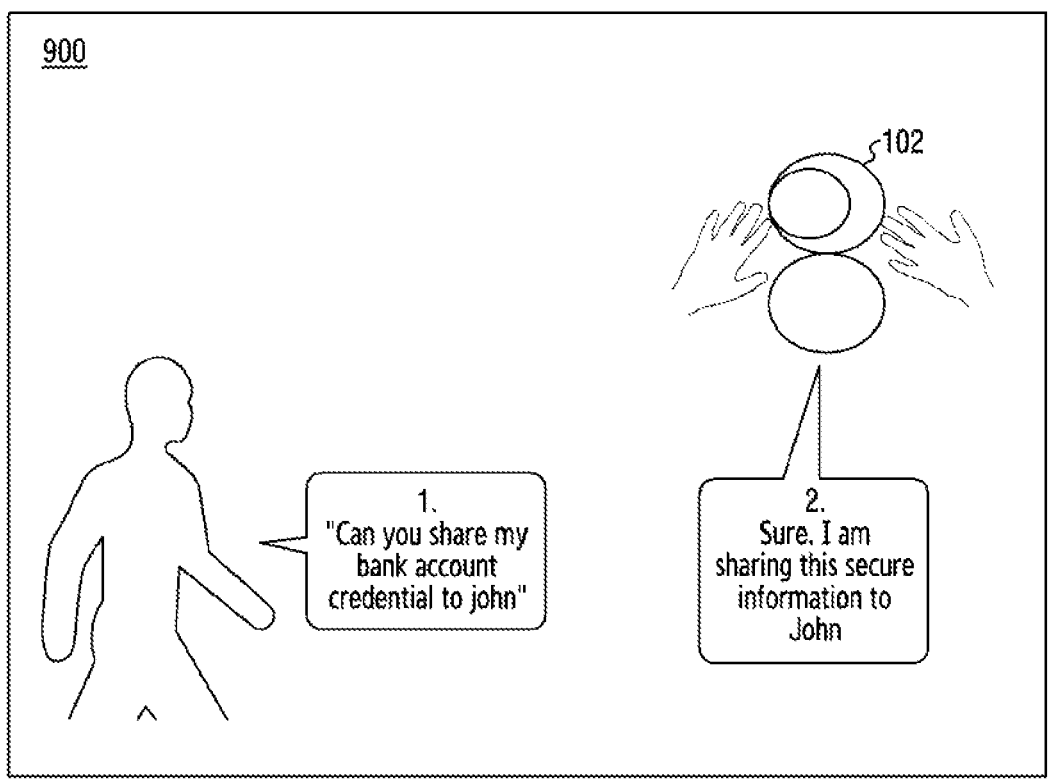
FIGS. 9A-9C illustrate an example scenario where the robot device shares secure information of the user with another user, according to an embodiment of the present disclosure.
Figure 9B:
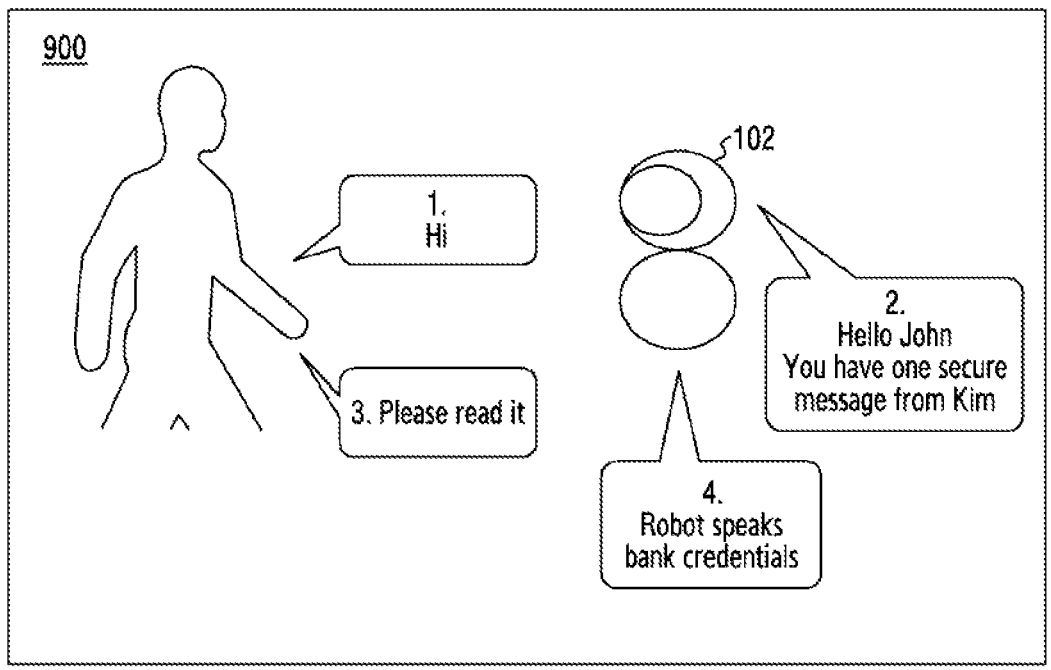
Figure 9C:
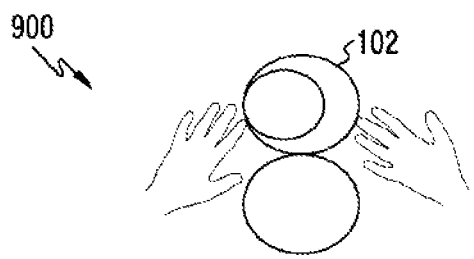

FIGS. 9A-9C illustrate an example scenario 900 where the robot device 102 shares secure information of the user with another user. In FIG. 9A, the user "Kim" holds the robot device 102 with two hands on the head region thereby providing a context indicative of a secure mode or a secure interaction. Accordingly, voice input indicative of sharing bank credentials with another user "John" is received by the robot device 102. Based on the context of being secure information, as determined by the interaction engine 206 and the intent resolver 210 (shown in FIGS. 2 and 3A), the robot device 102 stores the instruction in the memory 204. In FIG. 9B the user "John" provides a voice input indicative of request the stored password. The interaction engine 206 determines the voice input has come from the user "John" through the manner of speaking pertaining to the voice input. The interaction engine 206 directs the action handler 212 to provide the bank credentials stored in the memory 204 through a speaker coupled to the action handler 212.

Figure 10:
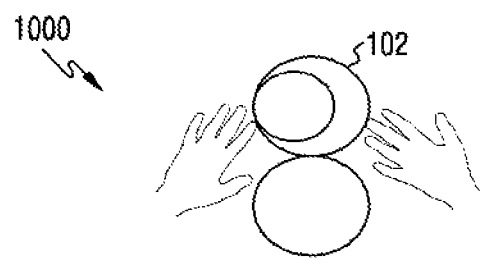
FIG. 10 illustrates an example scenario where a gestural input to the robot device is interpreted as a request to store secure information, according to an embodiment of the present disclosure.
Figure 10:
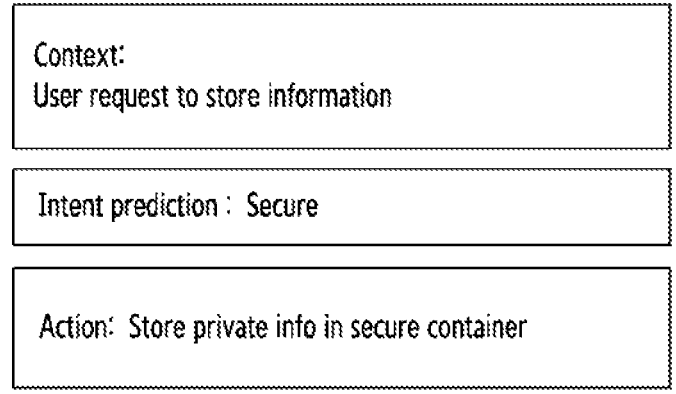
Figure 10:
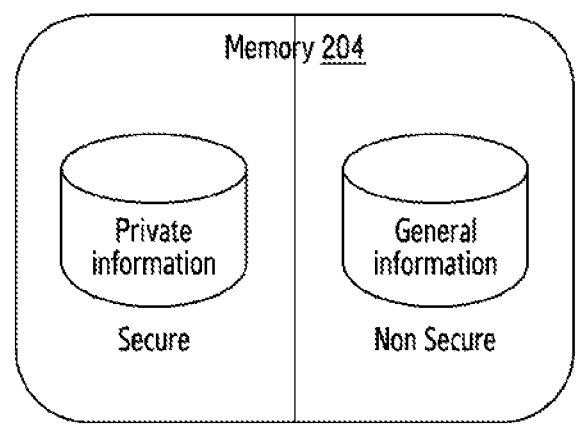

FIG. 10 illustrates an example scenario 1000 where a gestural input to the robot device 102 is interpreted as a request to store secure information. When the user holds the head region of the robot device 102, the intent resolver 210 infers the user intent to interact in a secure manner or store secure information in the memory 204.

Figure 11:
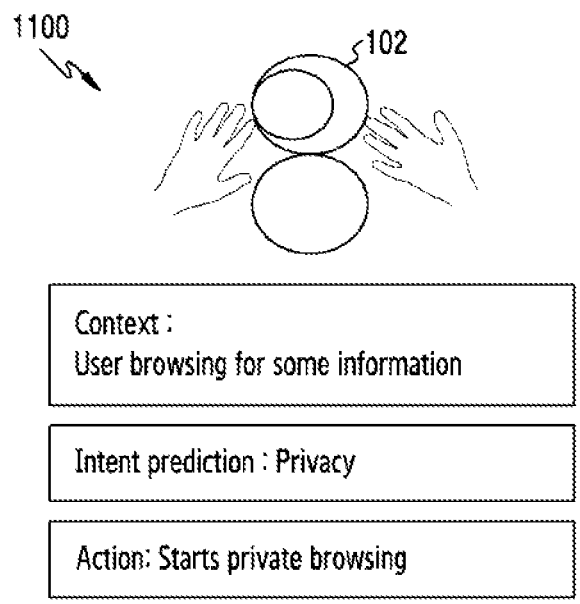
FIG. 11 illustrates an example scenario where a gestural input to the robot device is interpreted as a user request for private browsing, according to an embodiment of the present disclosure.

FIG. 11 illustrates an example scenario 1100 where a gestural input to the robot device is interpreted as a user request for private browsing. For example, the user may wish to search for secure information on the memory 204 or search for secure information over the Internet. Accordingly, upon the user holding the head region with both hands, the robot device 102 enters a secure mode.

Figure 12:
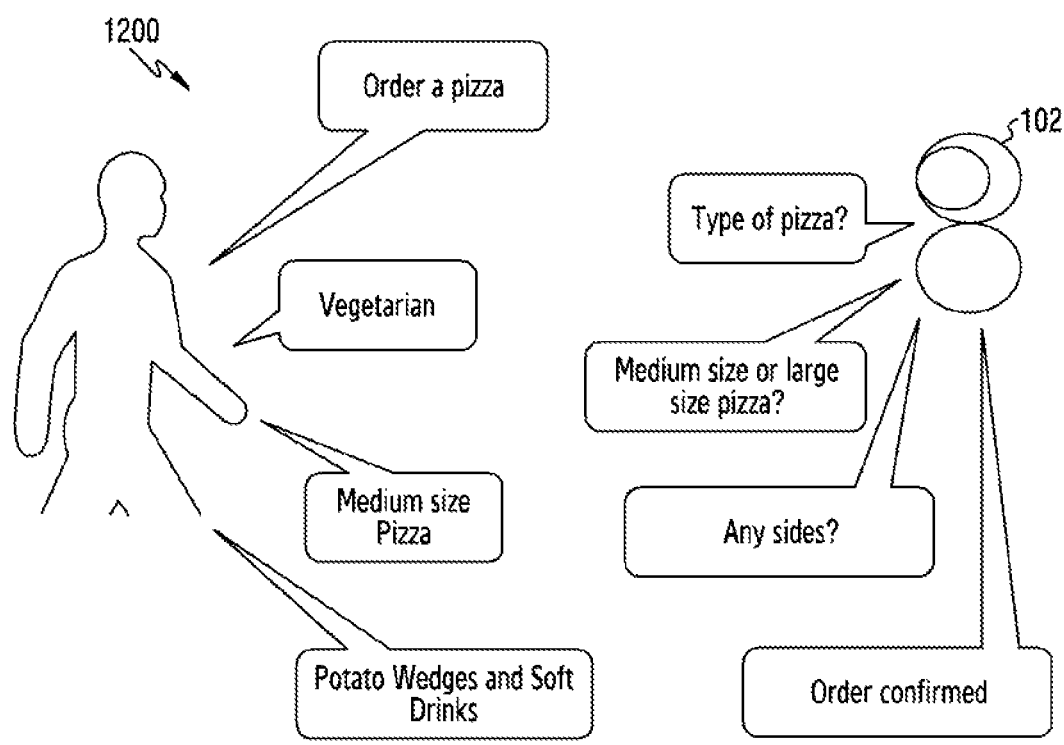
FIG. 12 illustrates an example scenario where the user socially interacts with the robot device to order food to be delivered, according to an embodiment of the present disclosure.

FIG. 12 illustrates an example scenario 1200 where the user socially interacts with the robot device 102 to order food to be delivered. As shown, the user interacts with the robot device 102 through voice input. The interaction engine 206 interprets the voice input accordingly to cater to the user's requests and to cause the action handler 212 to place an order over the Internet.

Figure 13:
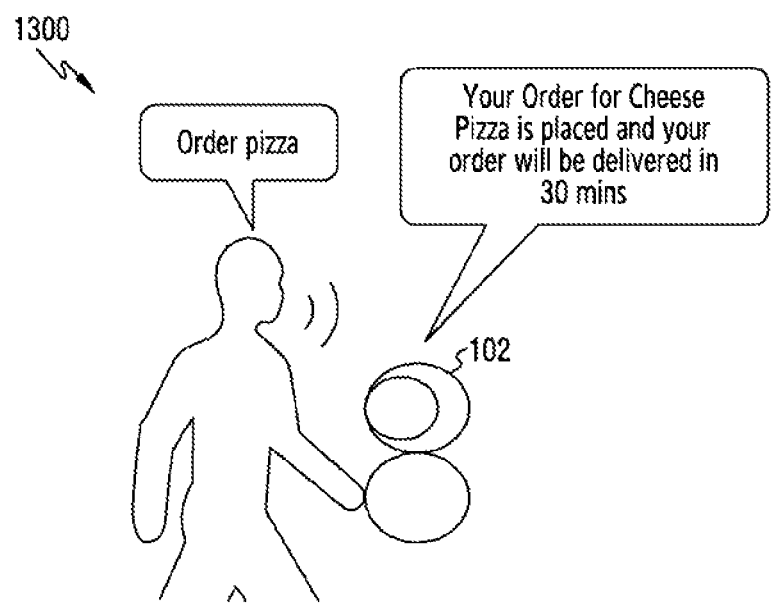
FIG. 13 illustrates another example scenario where the user socially interacts with the robot device to order food to be delivered, according to an embodiment of the present disclosure.

FIG. 13 illustrates an example scenario 1300 where the user socially interacts with the robot device 102 to order food to be delivered. Based on a tap on the front region of the robot device 102, the interaction region 206 determines the user's emotional state to be of frustration. In accordance with a voice input for ordering a pizza, and based on the mapping in the emotion model 312 (shown in FIGS. 3A and 3B), the intent resolver 210 automatically determines the user's intent to order cheese pizza. Accordingly, the action handler 212 is caused to place an order to a pizza delivery service over the Internet to deliver cheese pizza to the user's location. Additional conversation, as shown in example scenario 1200, is avoided using the trained emotion model 312.

Figure 14:
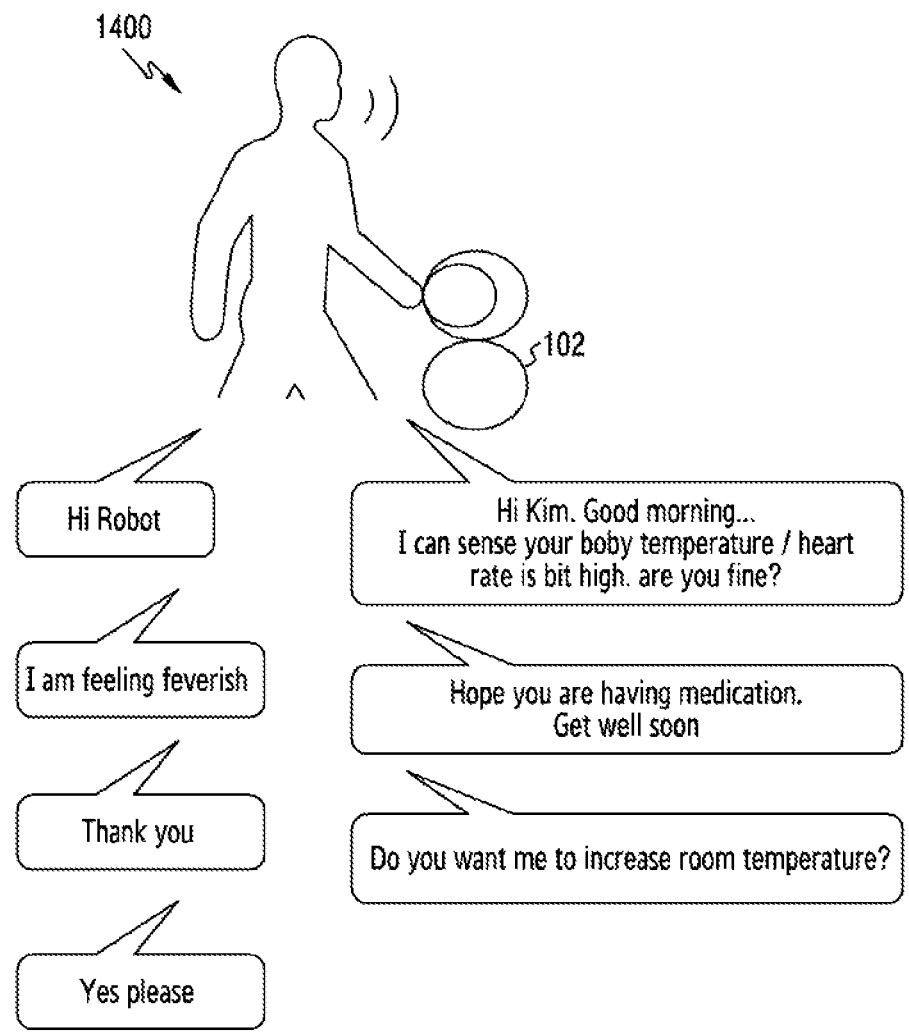
FIG. 14 illustrates an example scenario where the robot device detects the body temperature of the user, and interacts with the user based on the detected body temperature, according to an embodiment of the present disclosure.

FIG. 14 illustrates an example scenario where the robot device 102 detects the body temperature of the user through the sensor 208, and interacts with the user based on the detected body temperature. In some embodiments, the sensor 208 includes a temperature sensor and upon the user touching the robot device 102 on a region, the interaction engine 206 determines a higher body temperature pertaining to the user and this determination further informs future interactions. In some embodiments, the robot device 102 can be connected to a thermostat through an Internet of Things (IoT) network and can control room temperature.

Figure 15:
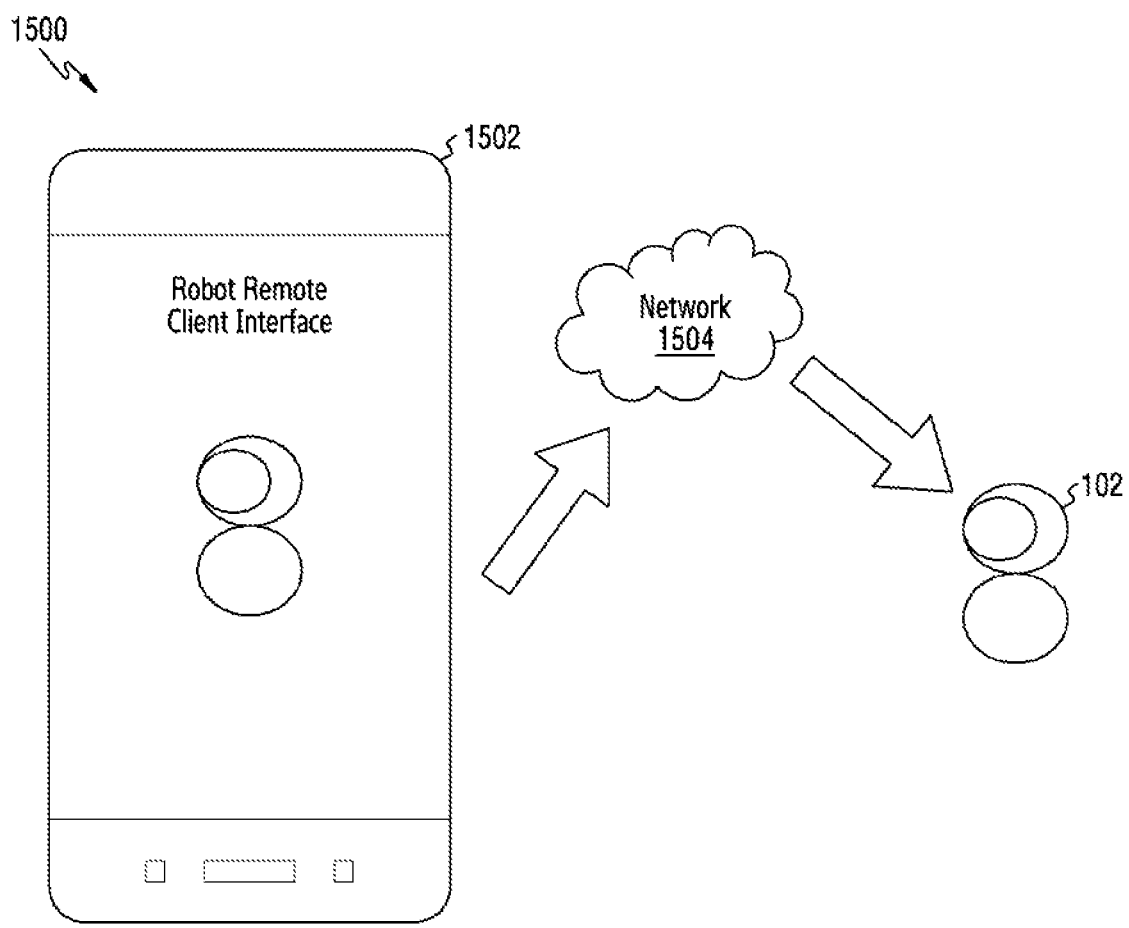
FIG. 15 illustrates an example scenario where the user provides input to the robot device from a remote client interface, according to an embodiment of the present disclosure.

FIG. 15 illustrates an example scenario 1500 where the user provides input to the robot device 102 from a remote client interface. The user may not be proximate to the robot device 102. The user may provide a request through the remote client interface that can be available as a webpage viewed through a smart phone, tablet or a remote computer. The remote client interface can be a mobile application executed on a smart phone or a tablet. FIG. 15 shows a smart phone 1502 with the remote client interface. The user provides a request or an input through the remote client interface. The user can provide a voice input or a gestural input through the remote client interface based on the facilities available on the smart phone 1502. The remote client interface can be caused to mimic an image of the robot device 102 and directs the user to mimic gestures the user may provide to the regions of the robot device 102. Accordingly, the input is transmitted through the communication network 1504 and is received by the robot device 102. The robot device 102 performs actions based on the method disclosed in FIGS. 3A, 3B, 4 and 5.

Figure 16:
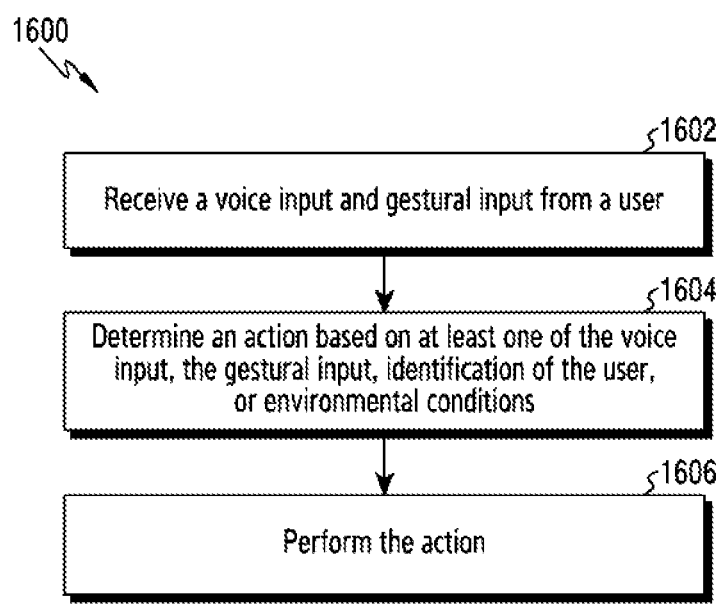
FIG. 16 is a flow diagram illustrating the method of social interaction with user inputs and other information to the robot device, according to an embodiment of the present disclosure.

FIG. 16 is a flow diagram illustrating the method of social interaction with user inputs and other information to the robot device, according to an embodiment of the present disclosure.

Referring to FIG. 16, at step 1602, the robot device 102 receives a voice input and gestural input from a user. The gestural input is detected at least one region among pre-defined regions on the robot device 102. The robot device 102 can determine a number of one or more touch points of the gestural input, or a type of the gestural input.

At step 1604, the robot device 102 determines an action based on at least one of the voice input, the gestural input, identification of the user, or environmental conditions. Herein, environmental conditions include at least one of time related conditions (e.g., a current time, a time zone corresponding to the current), natural conditions (e.g., weather, temperature), device related conditions (e.g., one or more other devices that are controlled by the robot device 102) and so on. In some embodiments, the robot device 102 determines an emotional state of the user based on the voice input and the gestural input. In some embodiments, the robot device 102 determines the identification of the user based on a voice recognition using the voice input, a face recognition using a camera, a fingerprint detection using the gestural input. The robot device 102 stores an action database, and retrieve the action corresponding a given parameters.

At step 1606, the robot device 201 performs the action. The action can include at least one of executing at least one function of the robot device 201, controlling one or more other device (i.e., a light, a speaker, a display device and so on), transmitting/receiving information over a network, or any combination thereof.

According to an embodiment described with FIG. 16, the robot device 102 determines an action based on at least one of the voice input, the gestural input, the identification of the user, or the environmental conditions. That is, the action depends on at least one of the voice input, the gestural input, the identification of the user, or the environmental conditions.

In an embodiment, when a first user and a second user provide same inputs (e.g., voice input and same gestural input), although other parameters (e.g., the environmental conditions) are identical, a first action provided to first user can be different from a second action provided to the second user. To do so, the robot device 102 stores characteristic information regarding a plurality of users. The characteristic information can be generated by a procedure for enrolling the users in advance.

In another embodiment, when a user provides same inputs in different time zones, although other parameters (e.g., voice input, gestural input, identification of the user, one or more other devices, whether and so on) are identical, a first action provided at a first time zone can be different from a second action provided at a second time zone. To do so, the action database can be classified by time zones.

The embodiments disclosed herein can be implemented through at least one software program running on at least one hardware device and performing network management functions to control the elements. The elements shown in FIGS. 1A-16 include blocks which can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of various embodiments, those skilled in the art will recognize that the embodiments herein can be practiced with modification within the spirit and scope of the embodiments as described herein.

Although the present disclosure has been described with various embodiments, various changes and modifications may be suggested to one skilled in the art. It is intended that the present disclosure encompass such changes and modifications as fall within the scope of the appended claims.

What is claimed is:

1. A method for operating an electronic device, the method comprising:
   detecting at least one gestural input from a user, wherein the at least one gestural input is detected at a specific region among at least one pre-defined region on the electronic device while a first action is being performed by the electronic device;
   determining an emotional state of the user corresponding to the at least one gestural input and the specific region, based on an emotional model comprising a mapping relationship between at least one type of the at least one gestural input, the at least one pre-defined region on the electronic device, and at least one emotional state;
   generating one or more contextual parameters based on the determined emotional state;
   performing a second action related to the first action based on the one or more contextual parameters;
   detecting another at least one gestural input, in response to the performed second action; and
   updating the emotional model based on the another at least one gestural input.

2. The method of claim 1, wherein performing the second action comprises:
   determining a set of parameters related to the at least one gestural input; and
   determining the second action based on the set of parameters,
   wherein the set of parameters comprises information on at least one of a voice input, a pressure exerted by a user on the specific region, biometric data of the user detected from the at least one gestural input, a speed of a gesture on the specific region, or a gesture pattern on the specific region.

3. The method of claim 2, wherein the biometric data of the user comprises at least one of a heart rate or a temperature of the user.

4. The method of claim 1, wherein the at least one gestural input comprises at least one of tapping or holding.

5. The method of claim 1, wherein the second action comprises at least one of reproducing a media, storing information indicated by a voice input or the at least one gestural input, entering a mode corresponding to the voice input or the at least one gestural input, or transmitting information indicated by the voice input or the at least one gestural input.

6. The method of claim 1, wherein determining the second action is further based on at least one of an identification of a user, or environmental conditions, and
   wherein the environmental conditions comprise at least one of time related conditions, natural conditions, or device related conditions.

7. An electronic device comprising:
one or more sensors arranged at least at one pre-defined region on the electronic device; and
a controller coupled with the one or more sensors and configured to:
  detect at least one gestural input from a user, wherein the at least one gestural input is detected at a specific region among the at least one pre-defined region on the electronic device while a first action is being performed by the electronic device;
  determine an emotional state of the user corresponding to the at least one gestural input and the specific region, based on an an emotional model comprising a mapping relationship between at least one type of the at least one gestural input, the at least one pre-defined region on the electronic device, and at least one emotional state,
  generate one or more contextual parameters based on the determined emotional state;
  perform a second action related to the first action based on the one or more contextual parameters;
  detect another at least in gestural input, in response to the performed second action; and
  update the emotional model based on the another at least one gestural input.

8. The electronic device of claim 7, wherein controller is further configured to:
determine a set of parameters related to the at least one gestural input; and
determine the second action based on the set of parameters,
wherein the set of parameters comprises information on at least one of a voice input, a pressure exerted by a user on the specific region, biometric data of the user detected from the at least one gestural input, a speed of a gesture on the specific region, or a gesture pattern on the specific region.

9. The electronic device of claim 8, wherein the biometric data of the user comprises at least one of a heart rate or a temperature of the user.

10. The electronic device of claim 7, wherein the at least one gestural input comprises at least one of tapping or holding.

11. The electronic device of claim 7, wherein the second action comprises at least one of reproducing a media, storing information indicated by a voice input or the at least one gestural input, entering a mode corresponding to the voice input or the at least one gestural input, or transmitting information indicated by the voice input or the at least one gestural input.

12. The electronic device of claim 7, wherein the controller is further configured to determine the second action based on an identification of a user, or environmental conditions, and
wherein the environmental conditions comprise at least one of time related conditions, natural conditions, or device related conditions.

* * * * *